United States Patent
Liang et al.

(10) Patent No.: US 9,698,978 B2
(45) Date of Patent: Jul. 4, 2017

(54) NETWORK EQUIPMENT AND AUTHENTICATION AND KEY MANAGEMENT METHOD FOR SAME

(71) Applicant: ZTE Corporation, Shenzhen, Guangdong (CN)

(72) Inventors: Qiongwen Liang, Shenzhen (CN); Weiliang Zhang, Shenzhen (CN); Lin Wang, Shenzhen (CN); Junjian Zhang, Shenzhen (CN); Dezhi Zhang, Shenzhen (CN); Boshan Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 186 days.

(21) Appl. No.: 14/407,525

(22) PCT Filed: May 28, 2013

(86) PCT No.: PCT/CN2013/076315
§ 371 (c)(1),
(2) Date: Jan. 13, 2015

(87) PCT Pub. No.: WO2013/185531
PCT Pub. Date: Dec. 19, 2013

(65) Prior Publication Data
US 2015/0172047 A1 Jun. 18, 2015

(30) Foreign Application Priority Data
Jun. 14, 2012 (CN) .......................... 2012 1 0195842

(51) Int. Cl.
*H04L 29/06* (2006.01)
*H04L 9/08* (2006.01)
(Continued)

(52) U.S. Cl.
CPC .............. *H04L 9/0844* (2013.01); *H04L 9/08* (2013.01); *H04L 9/0838* (2013.01); *H04L 63/06* (2013.01);
(Continued)

(58) Field of Classification Search
CPC ......... H04L 63/06; H04L 9/08; H04L 9/0838; H04W 12/04
See application file for complete search history.

(56) References Cited

U.S. PATENT DOCUMENTS

2005/0025125 A1* 2/2005 Kwan ................... H04L 63/10
370/352
2006/0236116 A1 10/2006 Patel
(Continued)

FOREIGN PATENT DOCUMENTS

CN 101068143 A 11/2007
CN 101141241 A 3/2008
(Continued)

OTHER PUBLICATIONS

Mengi et al., "IEEE 1905.1 hybrid home networking standard and its implementation with PLC, Wi-Fi and Ethernet technologies", 2016, pp. 162-166.*
(Continued)

*Primary Examiner* — Kenneth Chang
*Assistant Examiner* — Thaddeus Plecha
(74) *Attorney, Agent, or Firm* — Oppedahl Patent Law Firm LLC

(57) ABSTRACT

Provided is a network equipment and an authentication and key management method for the same. The network equipment generates a Network Key (NK); the network equipment performs authentication protocol interaction with opposite communication equipment, and calculates a Basic Session Key (BSK) according to parameters for the authen-
(Continued)

tication protocol interaction and the NK; and the network equipment calculates link Encryption Keys (EKs) used respectively for Media Access Control (MAC) and Physical (PHY) layers using various access technologies according to the BSK, and provides the EKs for respective MAC and PHY layer function modules. With the disclosure, the legality of the equipment is verified by performing an authentication process on the heterogeneous network equipments in one pass, and keys in various MAC layer technologies are managed in a unified way.

16 Claims, 4 Drawing Sheets

(51) Int. Cl.
*H04W 12/04* (2009.01)
*H04W 12/06* (2009.01)

(52) U.S. Cl.
CPC ............. *H04L 63/08* (2013.01); *H04W 12/04* (2013.01); *H04L 63/162* (2013.01); *H04W 12/06* (2013.01)

(56) References Cited

U.S. PATENT DOCUMENTS

| | | |
|---|---|---|
| 2006/0291663 A1 | 12/2006 | Aissi |
| 2008/0311906 A1 | 12/2008 | Suh |
| 2009/0217032 A1 | 8/2009 | Guan |
| 2010/0211786 A1 | 8/2010 | Lim |
| 2010/0332833 A1 | 12/2010 | Aissi |
| 2011/0010538 A1* | 1/2011 | Falk ............. H04L 63/06 713/155 |
| 2011/0047382 A1* | 2/2011 | Wang ............. H04W 12/04 713/170 |
| 2011/0078442 A1 | 3/2011 | Gong |
| 2011/0271110 A1* | 11/2011 | Ohba ............. H04L 9/0891 713/168 |
| 2012/0239929 A1* | 9/2012 | Newman ............. H04L 63/06 713/168 |
| 2012/0311683 A1* | 12/2012 | Klein ............. H04L 63/06 726/6 |
| 2013/0095789 A1* | 4/2013 | Keevill ............. H04W 12/06 455/411 |

FOREIGN PATENT DOCUMENTS

| | | |
|---|---|---|
| CN | 101304319 A | 11/2008 |
| CN | 101516090 A | 8/2009 |
| CN | 101621374 A | 1/2010 |
| CN | 101815294 A | 8/2010 |
| CN | 102447690 A | 5/2012 |
| EP | 1872514 A2 | 1/2008 |
| WO | 2009020281 A1 | 2/2009 |

OTHER PUBLICATIONS

International Search Report in international application No. PCT/CN20131076315, mailed on Sep. 5, 2013.
English Translation of the Written Opinion of the International Search Authority in international application No. PCT/CN20131076315, mailed on Sep. 5, 2013.
Supplementary European Search Report in European application No. 13804786.5, mailed on Aug. 4, 2015.

* cited by examiner

NETWORK EQUIPMENT AND AUTHENTICATION AND KEY MANAGEMENT METHOD FOR SAME

TECHNICAL FIELD

The disclosure relates to a heterogeneous network convergence technology, in particular to a network equipment and an authentication and key management method for the same.

BACKGROUND

At present, a home network can be accessed by virtue of multiple network technologies, for example: Ethernet Institute of Electrical and Electronics Engineers (IEEE) 802.3, Power Line Communication (PLC), Multimedia over Coax Alliance (MoCA) and a Wireless Fidelity (WiFi) technology, and each access technology corresponds to a Physical (PHY) layer and a Media Access Control (MAC) layer of a network system model. The convergence of the heterogeneous network technologies is a basis for realizing the information sharing and seamless connection of the home network.

FIG. 1 is a structure diagram of heterogeneous network convergence in prior art. As shown in FIG. 1, equipment 1 and equipment 2 are home network equipments using three MAC layer and PHY layer access technologies. Each network access technology uses a different communication media, media control access mode, transmission frame format and the like from those used by another network access technology, so that technologies for PHY layers and MAC layers of corresponding network systems are different from each other. Therefore, when multiple network access technologies are implemented on one equipment, a convergence control module is required to realize the coordination and scheduling of various MAC layer and PHY layer technologies to realize seamless technical convergence. Each equipment corresponds to a convergence control module, and each convergence control module can coordinate and manage at least two MAC layer and PHY layer function modules.

At present, the most common security configuration for home networking is implemented by inputting a password to a network equipment by a user, and although there is security configuration supporting user password input in the MAC layer technologies such as PLC, MoCA and WiFi, authentication and key management processes in various MAC layer technologies process the user password input procedure differently, which causes the non-interworking of various security management processes. For example, assuming that the equipment 1 and the equipment 2 in FIG. 1 are configured with a same user password, if the two equipments are connected only through a PLC link, the equipments process the user password according to an authentication and key negotiation process of the PLC, and calculate a link Encryption Key (EK) of the PLC; and if the equipment 1 and the equipment 2 are connected by virtue of three MAC layer technologies, the two equipments have to use the user password to perform authentication and key negotiation processes specified by the three MAC layer technologies, so as to obtain link EKs of the three links respectively. That is, the security authentication and key management process in the prior art is performed for each MAC layer interface on the network equipment rather than for the equipment itself; and authentication and key management methods for each MAC layer technology are different from one another, so that the authentication and key negotiation process specified by each MAC layer technology has to be performed when the network equipment is connected by virtue of multiple MAC layer technologies, which inevitably causes calculation resource waste in an authentication process.

SUMMARY

An embodiment of the disclosure provides a network equipment and an authentication and key management method for the same, for avoid calculation resource waste in an authentication execution process caused by applying different authentication and key management methods for various MAC layer technologies in the prior art.

In view of the above, the embodiment of the disclosure is implemented as follows:

the embodiment of the disclosure provides an authentication and key management method for network equipment, the method including that:

the network equipment generates a Network Key (NK);

the network equipment performs authentication protocol interaction with opposite communication equipment, and calculates a Basic Session Key (BSK) according to authentication protocol interaction parameters and the NK; and the network equipment calculates link EKs used for MAC and PHY layers using various access technologies according to the BSK, and provides the respective EKs for respective MAC and PHY layer function modules.

Preferably, the network equipment generates the NK according to an acquired password, or the network equipment generates the NK by using a WPS Push-Button function in a wireless local network WiFi.

Preferably, after the EKs are provided for the respective MAC and PHY layer function modules, the method further includes that:

the MAC and PHY layer function modules perform encryption and decryption protection on the data communicated between the network equipment and the opposite communication equipment according to the acquired EKs.

Preferably, before the network equipment generates the NK according to the acquired password, the method further includes that:

the network equipment and the opposite communication equipment interact about equipment capability information, and after both the network equipment and the opposite communication equipment are confirmed to support a specific authentication and key management function, subsequent processing operation is performed.

Preferably, the step that the network equipment calculates the link EKs used respectively for the MAC and PHY layers using various access technologies according to the BSK, and provides the EKs for the respective MAC and PHY layer function modules includes that:

the BSK is input into a key deduction algorithm implemented by a hash function for calculation, and the EKs with respective lengths are output to the respective MAC and PHY layer function modules according to the EK lengths required by the MAC and PHY layers using various access technologies.

Preferably, the MAC and PHY layers using various access technologies include:

MAC and PHY layers using PLC;
MAC and PHY layers using MoCA; and
MAC and PHY layers using WiFi.

Preferably, the authentication protocol interaction parameters include: a convergence control module Identifier (ID) of the network equipment, a Random Number (RN) selected by the network equipment, a convergence control module ID of the opposite communication equipment and an RN selected by the opposite communication equipment;

the convergence control module ID of the network equipment is a MAC address of a convergence control module of the network equipment, or a MAC address which uniquely identifies the identity of the network equipment; and the convergence control module ID of the opposite communication equipment is a MAC address of a convergence control module of the opposite communication equipment, or a MAC address which uniquely identifies the identity of the opposite communication equipment.

Preferably, the BSK includes: a unicast BSK and/or a multicast BSK;

accordingly, the method further includes that:

the network equipment calculates unicast EKs according to the unicast BSK, and calculates multicast EKs according to the multicast BSK; and the MAC and PHY layer function modules of the network equipment perform encryption and decryption protection on unicast data according to the unicast EKs, and perform encryption and decryption protection on multicast data according to the multicast EKs.

The embodiment of the disclosure also provides network equipment, which includes: a convergence control module and MAC and PHY layer function modules using various access technologies, wherein the convergence control module is configured to generate an NK, and is further configured to perform authentication protocol interaction between the network equipment and opposite communication equipment, calculate a BSK according to parameters for authentication protocol interaction and the NK, calculate link EKs used respectively for MAC and PHY layers using various access technologies and provide the EKs for the respective MAC and PHY layer function modules; and the MAC and PHY layer function modules are configured to receive the respective EKs provided by the convergence control module.

Preferably, the convergence control module generates the NK according to an acquired password, or generates the NK by using a WPS Push-Button function in a wireless local network WiFi.

Preferably, the MAC and PHY layer function modules are further configured to perform encryption and decryption protection on the data communicated between the network equipment and the opposite communication equipment according to the acquired EKs.

Preferably, the convergence control module is further configured to, before generating the NK according to the acquired password, interact with the opposite communication equipment about equipment capability information, and after both the network equipment and the opposite communication equipment are confirmed to support a specific authentication and key management function, perform subsequent processing operation.

Preferably, the convergence control module is further configured to input the BSK into a key deduction algorithm implemented by a hash function for calculation and output the EKs with respective lengths to the respective MAC and PHY layer function modules according to the EK lengths required by the MAC and PHY layers using various access technologies.

Preferably, the MAC and PHY layers using various access technologies include:
 MAC and PHY layers using PLC;
 MAC and PHY layers using MoCA; and
 MAC and PHY layers using WiFi.

Preferably, the authentication protocol interaction parameters include: a convergence control module ID of the network equipment, an RN selected by the network equipment, a convergence control module ID of the opposite communication equipment and an RN selected by the opposite communication equipment;

the convergence control module ID of the network equipment is a MAC address of the convergence control module of the network equipment, or a MAC address which uniquely identifies the identity of the network equipment; and the convergence control module ID of the opposite communication equipment is a MAC address of a convergence control module of the opposite communication equipment, or a MAC address which uniquely identifies the identity of the opposite communication equipment.

Preferably, the BSK includes: a unicast BSK and/or a multicast BSK;

accordingly, convergence control module is further configured to calculate unicast EKs according to the unicast BSK and calculate multicast EKs according to the multicast BSK; and the MAC and PHY layer function modules are further configured to perform encryption and decryption protection on unicast data according to the unicast EKs and perform encryption and decryption protection on multicast data according to the multicast EKs.

According to the network equipment and the authentication and key management method for the same provided by the embodiment of the disclosure, legality authentication between a network and equipment and between equipment and equipment can be implemented only by executing a unified authentication protocol flow once by the convergence control module of the network equipment without executing various authentication protocol flows of the MAC and PHY layers by virtue of the password input by a user by the multiple MAC and PHY layer function modules on the network equipment, so that a calculation resource in an authentication process is saved. In addition, keys in various MAC and PHY layer technologies are managed in a unified way, and a data encryption and decryption manner used by various MAC and PHY layer function modules can be kept unchanged, so that cost in the upgrading of such a function of the equipment will be reduced.

DETAILED DESCRIPTION

The technical solution of the disclosure is further described below with reference to the drawings and specific embodiments in detail.

Figure 1:
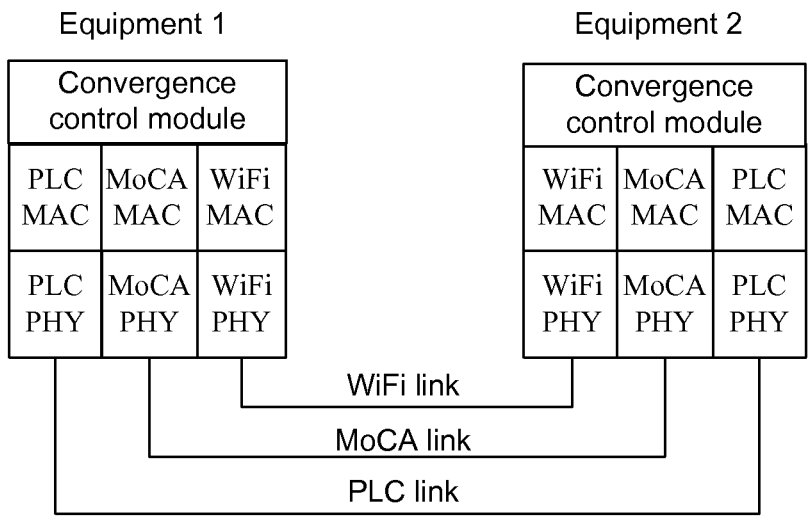
FIG. 1 is a structure diagram of heterogeneous network convergence in prior art.
Figure 2:
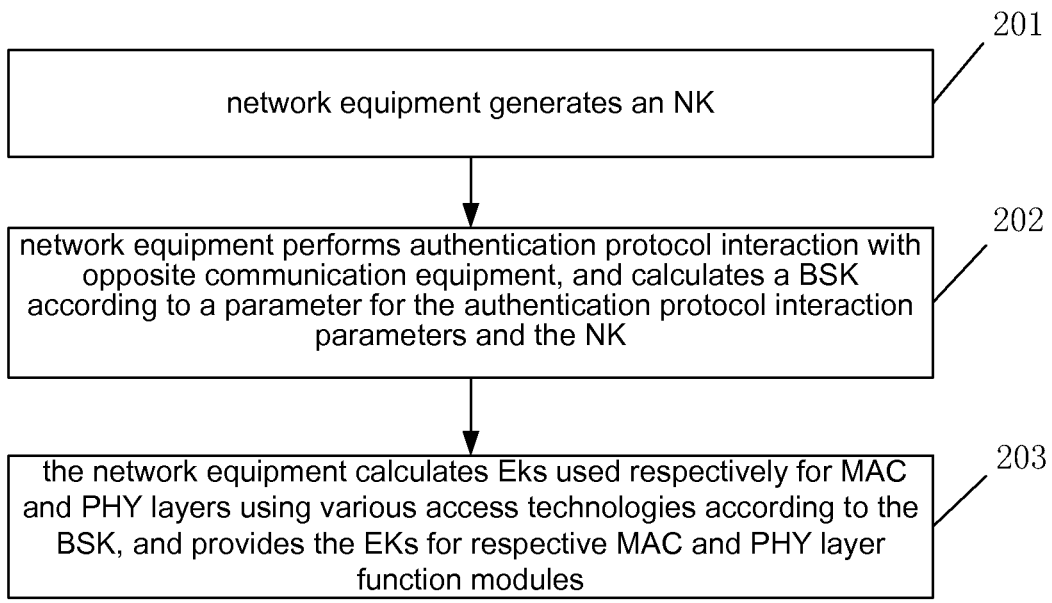
FIG. 2 is a flowchart of an authentication and key management method for a network equipment according to embodiment 1 of the disclosure.

As shown in FIG. 2, an authentication and key management method for a network equipment according to embodiment 1 of the disclosure mainly includes the following steps:

Step 201: the network equipment generates an NK.

The network equipment can generate the NK according to an acquired password. Specifically, a user inputs the password at a user interface of the network equipment, a length of the password not exceeding a maximum length set by the user interface, and the network equipment inputs the password input by the user to a pseudo-random function for calculation, so as to acquire the NK with a fixed length.

Besides acquiring the NK by the user inputting the password, if the network equipment has a simple security configuration function according to an implementation specification for simple WiFi configuration, the network equipment may generate the NK by using a WPS Push-Button function in WiFi.

Specifically, if the network equipments of both the communication parties have WPS Push-Button functions and a communication protocol function specified in the simple configuration specification for WiFi, the two network equipments can interact with each other according to the communication protocol specified in the simple configuration specification for WiFi by pressing the WPS Push-Button functions on the two network equipments within a specific time interval (for example, 2 minutes) after the network equipments are connected through certain physical medium. After the protocol is successfully performed, the two network equipment can acquire the NK with the fixed length.

Step 202: the network equipment performs authentication protocol interaction with opposite communication equipment, and calculates a BSK according to parameters for the authentication protocol interaction and the NK.

The network equipment inputs the parameters for authentication protocol interaction and the NK into a hash function to calculate the BSK.

Authentication may be the authentication of a network side over the network equipment, and also may be the authentication of network equipment over network equipment; and if the authentication is the authentication of the network side over the network equipment, the opposite communication equipment is authentication equipment on the network side, and if the authentication is the authentication of the network equipment over the network equipment, the opposite communication equipment is another network equipment.

An authentication protocol interaction process is performed by convergence control modules of the network equipment and the opposite communication equipment, and will be specifically described in the subsequent embodiment in detail.

Step 203: the network equipment calculates link EKs used respectively for MAC and PHY layers using various access technologies according to the BSK, and provides the EKs for respective MAC and PHY layer function modules.

In the embodiment, the MAC and PHY layers using various access technologies at least include: MAC and PHY layers using PLC, MAC and PHY layers using MoCA, MAC and PHY layers using WiFi and the like.

The convergence control module of the network equipment inputs the BSK into a key deduction algorithm implemented by the hash function for calculation, and outputs the EKs with respective lengths to the respective MAC and PHY layer function modules according to the EK lengths required by the MAC and PHY layers using various access technologies. Wherein, the key deduction algorithm implemented by the hash function can output keys with enough lengths, and if it is supposed that a key length required by the MAC and PHY layers using PLC is m, a key length required by the MAC and PHY layers using WiFi is n and a key length required by the MAC and PHY layers using MoCA is t, the key deduction algorithm implemented by the hash function can output a key with a length x which should be greater than or equal to a maximum numerical value in m, n and t.

The convergence control module outputs the EKs with the respective lengths according to the key lengths required by specific MAC and PHY layers, and the specific MAC and PHY layers may be the MAC and PHY layers using WiFi, or the MAC and PHY layers using MoCA or the MAC and PHY layers using PLC. The length x of the key output by the key deduction algorithm implemented by the hash function is greater than or equal to the maximum numerical value in m, n and t, so that the convergence control module is required to extract a part (which can be extracted from any position of a key string) with a length n from the key string with a length x as the EK of the specific MAC and PHY layers for output if it is supposed that the key length n required by the specific MAC and PHY layers is smaller than x. The convergence control module transmits the output EK to specific MAC and PHY layer function modules. For example, if the length of the key string generated by the key deduction algorithm implemented by the hash function is 512 bits and the key length required by the MAC and PHY layers using PLC is 256 bits, the former 256 bits are extracted from the key string as the EK for the MAC and PHY layers using PLC; and the convergence control module outputs the extracted 256-bit EK to the MAC and PHY layer function modules using PLC.

Figure 3:
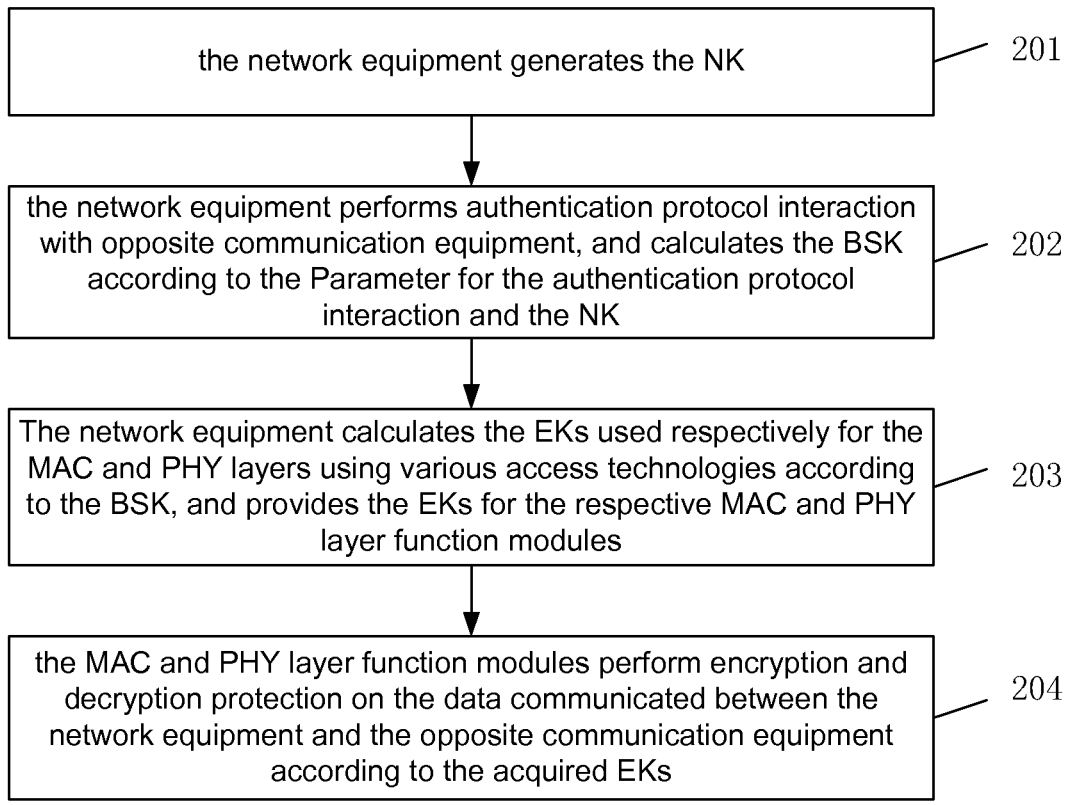
FIG. 3 is a flowchart of an authentication and key management method for a network equipment according to embodiment 2 of the disclosure.

As a preferred embodiment, as shown in FIG. 3, after the Step 203, Step 204 can also be performed: the MAC and PHY layer function modules perform encryption and decryption protection on the data of communication between the network equipment and the opposite communication equipment. Specifically, the MAC and PHY layer function modules store and install the acquired EKs, and subsequently perform encryption and decryption protection on the data of communication between the network equipment and the opposite communication equipment by using the installed EKs. For example: the MAC and PHY layer function modules using PLC acquire the EKs which are output by the convergence control module and correspond to the MAC and PHY layers using PLC, the MAC and PHY layer function modules using MoCA acquire the EKs which are output by the convergence control module and correspond to the MAC and PHY layers using MoCA, and the MAC and PHY layer function modules using WiFi acquire the EKs which are output by the convergence control module and correspond to the MAC and PHY layers using WiFi.

It should be noted that the BSK in the embodiment of the disclosure includes: a unicast BSK and/or a multicast BSK; correspondingly, the network equipment calculates unicast EKs according to the unicast BSK, and calculates multicast EKs according to the multicast BSK; and the MAC and PHY layer function modules of the network equipment perform encryption and decryption protection on unicast data according to the unicast EKs, and perform encryption and decryption protection on multicast data according to the multicast EKs.

Figure 4:
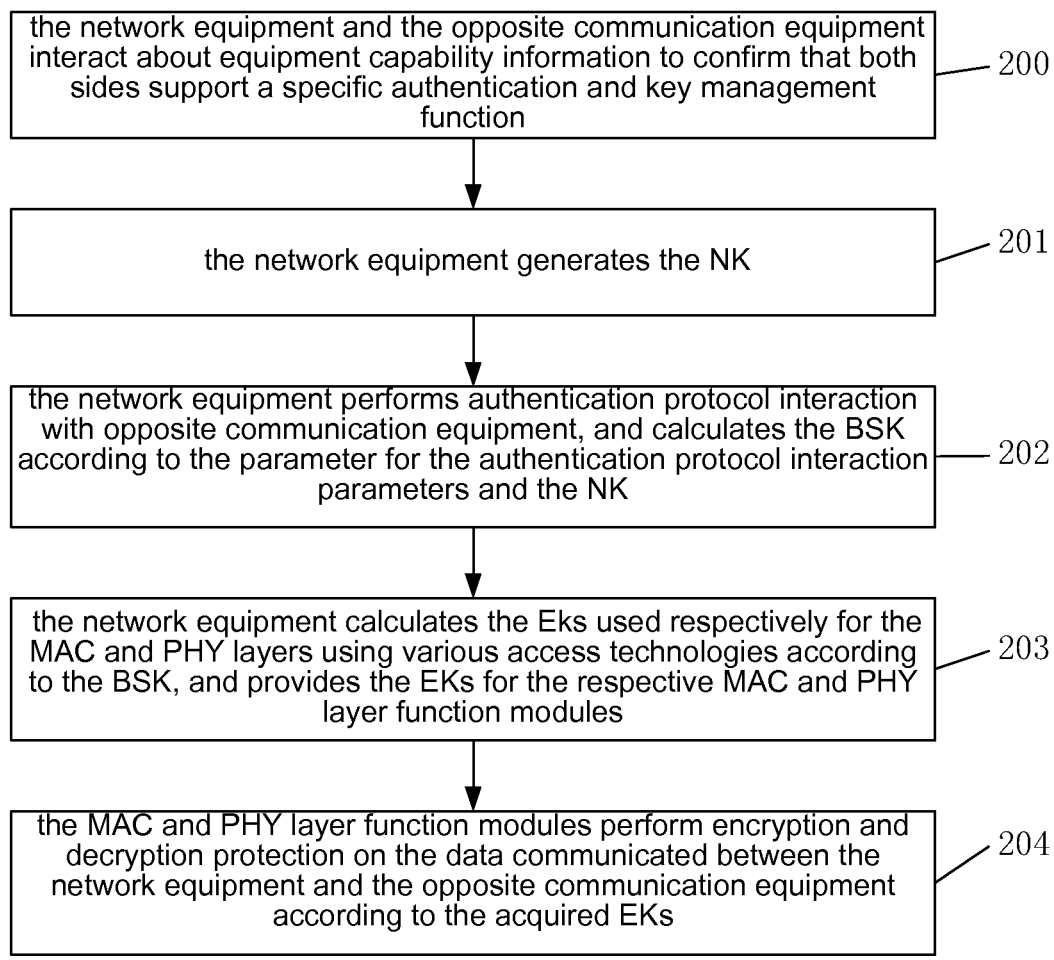
FIG. 4 is a flowchart of an authentication and key management method for a network equipment according to embodiment 3 of the disclosure.
Figure 5:
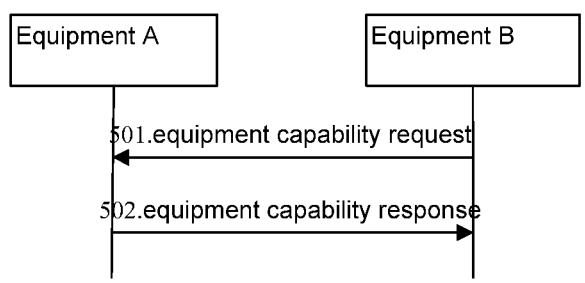
FIG. 5 is a flowchart of equipment capability information interaction according to an embodiment of the disclosure.

As another preferred embodiment of the disclosure, as shown in FIG. 4, before Step 201, Step 200 can also be performed: the network equipment and the opposite communication equipment interact about equipment capability information, and only when it is confirmed that both the network equipment and the opposite communication equipment support a specific authentication and key management function (i.e. a function of executing Step 201 to Step 204) in the embodiment of the disclosure, subsequent processing operation (i.e. Step 201 to Step 204) is performed. The interaction about the equipment capability information between equipment A and equipment B is taken as an example, and as shown in FIG. 5, a specific flow mainly includes that:

Step 501: the equipment B initiates an equipment capability request message to the equipment A.

The equipment capability request message includes whether the equipment B has the specific authentication and key management function in the embodiment of the disclosure or not. For example: if a value of a specific field in the request message is 0, it is indicated that the equipment B does not support the specific authentication and key management function in the embodiment of the disclosure; and if the value of the specific field is 1, it is indicated that the equipment B supports the specific authentication and key management function in the embodiment of the disclosure.

Step 502: the equipment A transmits an equipment capability response message to the equipment B.

The equipment capability response message includes whether the equipment A has the specific authentication and key management function in the embodiment of the disclosure or not. For example: if a value of a specific field in the request message is 0, it is indicated that the equipment A does not support the specific authentication and key management function in the embodiment of the disclosure; and if the value of the specific field is 1, it is indicated that the equipment A supports the specific authentication and key management function in the embodiment of the disclosure.

Only when both the equipment A and the equipment B support the specific authentication and key management function in the embodiment of the disclosure, the operation in the subsequent Step 201 to Step 204 is performed.

Figure 6:
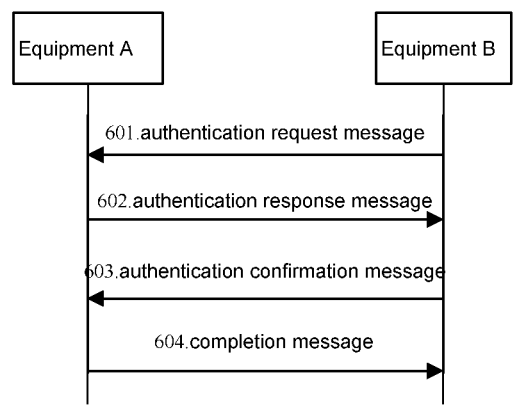
FIG. 6 is a flowchart of authentication protocol interaction according to an embodiment of the disclosure.

An authentication protocol interaction flow in the embodiment of the disclosure is described below with reference to FIG. 6 in detail, and as shown in FIG. 6, mainly includes the following steps that:

Step 601: the equipment B initiates an authentication request message to the equipment A.

The authentication request message at least includes: a convergence control module ID (IDB for short) on the equipment B and an RN selected by the equipment B (RNB for short).

Step 602: the equipment A returns an authentication response message to the equipment B after receiving the authentication request message.

The authentication response message includes at least: a convergence control module ID (IDA for short) on the equipment A, an RN (RNA for short) selected by the equipment A and a message authentication code for verifying the legality of the authentication response message.

Step 603: the equipment B returns an authentication confirmation message to the equipment A after receiving the authentication response message.

The authentication confirmation message at least includes: authentication success or failure status information, the convergence control module IDB on the equipment B and a message authentication code for verifying the legality of the authentication confirmation message.

Step 604: the equipment A transmits a completion message to the equipment B after receiving the authentication confirmation message returned by the equipment B.

The completion message includes at least: the authentication success or failure state information and a message authentication code for verifying the legality of the completion message.

In a specific application, the above involved convergence control module ID can adopt a MAC address of the convergence control module as well as a MAC address which can uniquely identify the identity of the equipment.

By the above authentication protocol interaction, the equipment A and the equipment B implement network key pre-sharing-based two-way authentication. After successful authentication, the equipment A and the equipment B input the IDB on the equipment B, the IDA on the equipment A, the RNB selected by the equipment B and the RNA selected by the equipment A into the hash function as the authentication protocol interaction parameters in Step 204 together with the NK obtained in Step 203 to calculate the BSK.

It can be seen that after the same password is input to the network equipment and the opposite communication equipment and the same Step 200 to Step 204 are performed, the MAC and PHY layer function modules, using PLC, of the network equipment and the MAC and PHY layer function modules, using PLC, of the opposite communication equipment can obtain the same EKs, and can perform encryption and decryption protection on the data of communication between the network equipment and the opposite communication equipment according to the EKs; similarly, the MAC and PHY layer function modules, using MoCA, of the network equipment and the MAC and PHY layer function modules, using MoCA, of the opposite communication equipment can also obtain the same EKs, and can perform encryption and decryption protection on the data of communication between the network equipment and the opposite communication equipment according to the EKs; and the MAC and PHY layer function modules, using WiFi, of the network equipment and the MAC and PHY layer function modules, using WiFi, of the opposite communication equipment can obtain the same EKs, and can perform encryption and decryption protection on the data of communication between the network equipment and the opposite communication equipment according to the EKs.

By the embodiment of the disclosure, legality authentication between a network and equipment and between equipment and equipment can be implemented only by executing a unified authentication protocol flow once by the convergence control module of the network equipment without executing various authentication protocol flows of the MAC and PHY layers by virtue of the password input by the user by the multiple MAC and PHY layer function modules on the network equipment, so that a calculation resource in an authentication process is saved. In addition, keys in various MAC and PHY layer technologies are managed in a unified way, and a data encryption and decryption manner used by various MAC and PHY layer function modules can be kept unchanged, so that cost in the upgrading of such a function of the equipment will not be high.

Based on the authentication and key management method, the embodiment of the disclosure also provides network equipment, which includes: a convergence control module and MAC and PHY layer function modules using various access technologies, wherein the convergence control module is configured to generate an NK, and is further configured to perform authentication protocol interaction between the network equipment and opposite communication equipment, calculate a BSK according to authentication protocol interaction parameters and the NK, calculate EKs used for MAC and PHY layers using various access technologies and provide the EKs for the corresponding MAC and PHY layer function modules respectively; and the MAC and PHY layer function modules are configured to receive the corresponding EKs provided by the convergence control module.

The MAC and PHY layers using various access technologies at least include: MAC and PHY layers using PLC; MAC and PHY layers using MoCA; and MAC and PHY layers using WiFi.

Preferably, the convergence control module can generate the NK according to an acquired password, or generate the NK in a manner of using a WPS Push-Button function in WiFi.

Preferably, the MAC and PHY layer function modules are further configured to perform encryption and decryption protection on the data communicated between the network equipment and the opposite communication equipment according to the acquired EKs.

Preferably, the convergence control module is further configured to, before generating the NK according to the acquired password, interact with the opposite communication equipment about equipment capability information, and after both the network equipment and the opposite communication equipment are confirmed to support a specific authentication and key management function, perform subsequent processing operation.

Preferably, the convergence control module is further configured to input the BSK into a key deduction algorithm implemented by a hash function for calculation and output the EKs with respective lengths to the respective MAC and PHY layer function modules according to the EK lengths required by the MAC and PHY layers using various access technologies.

The authentication protocol interaction parameters include: a convergence control module ID of the network equipment, an RN selected by the network equipment, a convergence control module ID of the opposite communication equipment and an RN selected by the opposite communication equipment;

the convergence control module ID of the network equipment is a MAC address of the convergence control module of the network equipment, or a MAC address which uniquely identifies the identity of the network equipment; and the convergence control module ID of the opposite communication equipment is a MAC address of a convergence control module of the opposite communication equipment, or a MAC address which uniquely identifies the identity of the opposite communication equipment.

Preferably, the BSK includes: a unicast BSK and/or a multicast BSK;

accordingly, convergence control module is further configured to calculate unicast EKs according to the unicast BSK and calculate multicast EKs according to the multicast BSK; the same method is adopted for calculating the unicast EKs according to the unicast BSK and calculating the multicast EKs according to the multicast BSK; and the MAC and PHY layer function modules are further configured to perform encryption and decryption protection on unicast data according to the unicast EKs and perform encryption and decryption protection on multicast data according to the multicast EKs.

If the modules in the embodiment of the disclosure are implemented in a form of a software function module, and are sold or used as independent products, the modules can also be stored in a computer-readable storage medium. Based on such understanding, the technical solution of the embodiment of the disclosure itself or a part contributing to the prior art can be embodied in a form of a software product, and the computer software product is stored in a storage medium, and includes multiple instructions configured to enable a piece of computer equipment (which may be a personal computer, a server, network equipment or the like) to perform all or a part of the method in each embodiment of the disclosure. The storage medium includes various media capable of storing program codes, such as: a Universal Serial Bus (USB) flash disk, a mobile hard disk drive, a Read-Only Memory (ROM), a Random Access Memory (RAM), a magnetic disk or an optical disc. Therefore, the embodiment of the disclosure is not limited to any specific hardware and software combination.

Accordingly, the embodiment of the disclosure also provides a computer storage medium, in which a computer program is stored, wherein the computer program is configured to perform an authentication and key management method in the embodiment of the disclosure.

The above is only the preferred embodiment of the disclosure and not intended to limit the scope of protection of the disclosure.

The invention claimed is:

1. An authentication and key management method for a network equipment, comprising:
   generating, by the network equipment, a Network Key (NK);
   performing, by the network equipment, authentication protocol interaction with an opposite communication equipment, and calculating a Basic Session Key (BSK) according to parameters for the authentication protocol interaction and the NK;
   calculating, by the network equipment, link Encryption Keys (EKs) used respectively for two or more Media Access Control (MAC) and Physical (PHY) layers corresponding to two or more access technologies according to the BSK, and providing the EKs for respective MAC and PHY layer function modules; and
   performing, by the MAC and PHY layer function modules, encryption and decryption protection on data communicated between the network equipment and the opposite communication equipment with the provided EKs.

2. The authentication and key management method for the network equipment according to claim 1, wherein the network equipment generates the NK according to an acquired password, or the network equipment generates the NK by using a Wi-Fi Protected Setup (WPS) Push-Button function in a Wireless Fidelity (WiFi) local network.

3. The authentication and key management method for the network equipment according to claim 2, further comprising:
   before generating, by the network equipment, the NK according to the acquired password,
   performing, by the network equipment and the opposite communication equipment, interaction about equipment capability information, and
   performing a subsequent processing operation, only after both the network equipment and the opposite communication equipment are confirmed to support a specific authentication and key management function.

4. The authentication and key management method for the network equipment according to claim 1, wherein calculating, by the network equipment, the link EKs used respectively for the two or more or more MAC and PHY layers corresponding to the two or more access technologies according to the BSK, and providing the EKs for the respective MAC and PHY layer function modules comprises:
 inputting the BSK into a key deduction algorithm implemented by a hash function for calculation, and
 outputting the EKs with respective lengths to the respective MAC and PHY layer function modules, according to the lengths of the EKs required by the two or more or more MAC and PHY layers corresponding to the two or more or more access technologies.

5. The authentication and key management method for the network equipment according to claim 1, wherein the two or more MAC and PHY layers corresponding to the two or more access technologies comprise:
 MAC and PHY layers using Power Line Communication (PLC);
 MAC and PHY layers using Multimedia over Coax Alliance (MoCA); and
 MAC and PHY layers using WiFi.

6. The authentication and key management method for the network equipment according to claim 1, wherein the parameters for the authentication protocol interaction comprise: convergence control module Identifier (ID) of the network equipment, Random Number (RN) selected by the network equipment, convergence control module ID of the opposite communication equipment and RN selected by the opposite communication equipment;
 the convergence control module ID of the network equipment is a MAC address of a convergence control module of the network equipment, or MAC address which uniquely identifies an identity of the network equipment; and
 the convergence control module ID of the opposite communication equipment is a MAC address of a convergence control module of the opposite communication equipment, or MAC address which uniquely identifies an identity of the opposite communication equipment.

7. The authentication and key management method for the network equipment according to claim 1, wherein the BSK comprises: a unicast BSK or a multicast BSK;
 the method further comprises:
 calculating, by the network equipment, unicast EKs according to the unicast BSK, or calculating multicast EKs according to the multicast BSK; and
 performing, by the MAC and PHY layer function modules of the network equipment, encryption and decryption protection on unicast data according to the unicast EKs, or performing encryption and decryption protection on multicast data according to the multicast EKs.

8. The authentication and key management method for the network equipment according to claim 1, wherein the BSK comprises: a unicast BSK and a multicast BSK;
 the method further comprises:
 calculating, by the network equipment, unicast EKs according to the unicast BSK, and calculating multicast EKs according to the multicast BSK; and
 performing, by the MAC and PHY layer function modules of the network equipment, encryption and decryption protection on unicast data according to the unicast EKs, and performing encryption and decryption protection on multicast data according to the multicast EKs.

9. A network equipment, comprising: a convergence control module and Media Access Control (MAC) and Physical (PHY) layer function modules corresponding to two or more access technologies,
 wherein the convergence control module is configured to generate a Network Key (NK), and is further configured to perform authentication protocol interaction between the network equipment and opposite communication equipment, calculate a Basic Session Key (BSK) according to parameters for the authentication protocol interaction and the NK, calculate link Encryption Keys (EKs) used respectively for two or more MAC and PHY layers corresponding to the two or more access technologies and provide the EKs for respective MAC and PHY layer function modules;
 wherein the MAC and PHY layer function modules are configured to receive the corresponding EKs provided by the convergence control module; and
 wherein the MAC and PHY layer function modules are further configured to perform encryption and decryption protection on data communicated between the network equipment and the opposite communication equipment with the provided EKs.

10. The network equipment according to claim 9, wherein the convergence control module generates the NK according to an acquired password, or generates the NK by using a Wi-Fi Protected Setup (WPS) Push-Button function in a Wireless Fidelity (WiFi) local network.

11. The network equipment according to claim 10, wherein the convergence control module is further configured to, before generating the NK according to the acquired password,
 interact with the opposite communication equipment about equipment capability information, and
 perform a subsequent processing operation, only after both the network equipment and the opposite communication equipment are confirmed to support a specific authentication and key management function.

12. The network equipment according to claim 9, wherein the convergence control module is further configured to input the BSK into a key deduction algorithm implemented by a hash function for calculation and output the EKs with respective lengths to the respective MAC and PHY layer function modules according to the lengths of the EKs required by the two or more MAC and PHY layers corresponding to the two or more access technologies.

13. The network equipment according to claim 9, wherein the two or more MAC and PHY layers corresponding to the two or more access technologies comprise:
 MAC and PHY layers using Power Line Communication (PLC);
 MAC and PHY layers using Multimedia over Coax Alliance (MoCA); and
 MAC and PHY layers using WiFi.

14. The network equipment according to claim 9, wherein the parameters for the authentication protocol interaction comprise: convergence control module Identifier (ID) of the network equipment, Random Number (RN) selected by the network equipment, convergence control module ID of the opposite communication equipment and RN selected by the opposite communication equipment;
 the convergence control module ID of the network equipment is a MAC address of the convergence control module of the network equipment, or MAC address which uniquely identifies an identity of the network equipment; and
 the convergence control module ID of the opposite communication equipment is a MAC address of a convergence control module of the opposite communication equipment, or MAC address which uniquely identifies an identity of the opposite communication equipment.

15. The network equipment according to claim 9, wherein the BSK comprises: a unicast BSK or a multicast BSK;

the convergence control module is further configured to calculate unicast EKs according to the unicast BSK or calculate multicast EKs according to the multicast BSK; and the MAC and PHY layer function modules are further configured to perform encryption and decryption protection on unicast data according to the unicast EKs or perform encryption and decryption protection on multicast data according to the multicast EKs.

16. The network equipment according to claim 9, wherein the BSK comprises: a unicast BSK and a multicast BSK;

the convergence control module is further configured to calculate unicast EKs according to the unicast BSK and calculate multicast EKs according to the multicast BSK; and the MAC and PHY layer function modules are further configured to perform encryption and decryption protection on unicast data according to the unicast EKs and perform encryption and decryption protection on multicast data according to the multicast EKs.

* * * * *